(12) United States Patent
    Meline

(10) Patent No.: US 11,597,173 B2
(45) Date of Patent: Mar. 7, 2023

(54) TRANSPARENCY REPAIR SYSTEM

(71) Applicant: Texstars, LLC, Grand Prairie, TX (US)

(72) Inventor: Ronald L. Meline, Arlington, TX (US)

(73) Assignee: Texstars, LLC, Grand Prairie, TX (US)

( * ) Notice: Subject to any disclaimer, the term of this patent is extended or adjusted under 35 U.S.C. 154(b) by 0 days.

(21) Appl. No.: 16/669,791

(22) Filed: Oct. 31, 2019

(65) Prior Publication Data
    US 2020/0115587 A1    Apr. 16, 2020
    US 2021/0380838 A9    Dec. 9, 2021

Related U.S. Application Data

(63) Continuation-in-part of application No. 16/281,505, filed on Feb. 21, 2019.

(60) Provisional application No. 62/633,837, filed on Feb. 22, 2018.

(51) Int. Cl.
    *B29C 73/26*    (2006.01)
    *C09D 175/06*   (2006.01)
    *C08G 18/24*    (2006.01)
    *C08G 18/32*    (2006.01)
    *B29C 73/02*    (2006.01)
    *C08G 18/42*    (2006.01)
    *C08G 18/73*    (2006.01)
    *C08G 18/79*    (2006.01)
    *C08G 18/66*    (2006.01)
    *B29K 75/00*    (2006.01)
    *C08K 5/00*     (2006.01)
    *C08K 5/17*     (2006.01)

(52) U.S. Cl.
    CPC ............. *B29C 73/02* (2013.01); *B29C 73/26* (2013.01); *C08G 18/242* (2013.01); *C08G 18/246* (2013.01); *C08G 18/3206* (2013.01); *C08G 18/4241* (2013.01); *C08G 18/4277* (2013.01); *C08G 18/664* (2013.01); *C08G 18/6607* (2013.01); *C08G 18/73* (2013.01); *C08G 18/792* (2013.01); *C09D 175/06* (2013.01); *B29C 2073/262* (2013.01); *B29K 2075/00* (2013.01); *C08K 5/005* (2013.01); *C08K 5/17* (2013.01)

(58) Field of Classification Search
    CPC ... B29C 73/02; B29C 73/26; B29C 2073/262; B29K 2075/00; C08G 18/6607; C08G 18/4277; C08G 18/792; C08G 18/664; C08G 18/3206; C08G 18/4241; C08G 18/242; C08G 18/73; C09D 175/06; C08K 5/005; C08K 5/17
    See application file for complete search history.

(56) References Cited

U.S. PATENT DOCUMENTS

| | | | |
|---|---|---|---|
| 6,183,249 B1* | 2/2001 | Brennan | A61C 7/16 206/369 |
| 8,227,565 B2 | 7/2012 | Wu et al. | |
| 8,580,346 B2* | 11/2013 | Norville | B05D 3/12 427/307 |
| 2004/0116013 A1* | 6/2004 | Yoshida | H05K 9/0096 442/43 |
| 2005/0271881 A1* | 12/2005 | Hong | C08G 18/3821 428/423.1 |
| 2010/0285293 A1* | 11/2010 | Lee | C09J 7/20 428/355 R |
| 2010/0304069 A1* | 12/2010 | Oguri | H05K 9/0094 156/308.2 |
| 2011/0136974 A1* | 6/2011 | Wu | A63B 37/0003 524/765 |
| 2013/0089731 A1 | 4/2013 | Imanaka et al. | |
| 2013/0228365 A1* | 9/2013 | Uprety | H05K 1/0353 156/60 |
| 2014/0000702 A1 | 1/2014 | Aruga et al. | |
| 2014/0073458 A1* | 3/2014 | Michalewich | A63B 37/0022 473/374 |
| 2015/0087774 A1 | 3/2015 | Greszta-Franz et al. | |
| 2016/0046088 A1* | 2/2016 | Haag | B05D 3/002 427/535 |
| 2016/0339652 A1* | 11/2016 | Safai | B29C 70/745 |
| 2017/0150659 A1* | 5/2017 | Uprety | B64C 1/1492 |
| 2019/0016848 A1 | 1/2019 | Nakagawa et al. | |
| 2019/0083852 A1* | 3/2019 | Sullivan | C08G 18/10 |
| 2019/0083853 A1* | 3/2019 | Sullivan | C08J 7/042 |
| 2019/0153259 A1 | 5/2019 | Li et al. | |
| 2019/0217560 A1* | 7/2019 | Weise | B29C 73/02 |
| 2020/0056072 A1 | 2/2020 | Lu et al. | |

* cited by examiner

*Primary Examiner* — Joseph S Del Sole
*Assistant Examiner* — Baileigh Kate Darnell
(74) *Attorney, Agent, or Firm* — Michael J. Grese

(57) ABSTRACT

The present invention provides a composition as well as a method for repairing deep scratches, gouges, etc. and which is particularly useful for aircraft and aerospace transparency repair. The composition is a blend of a polishable two-part, solvent-free, polyurethane coating composition for repairing the transparencies and which, after application, cures to a thermoset polyurethane. An optical grid is emplaced over the area to be repaired prior to applying the blend.

12 Claims, No Drawings

TRANSPARENCY REPAIR SYSTEM

CROSS REFERENCE TO RELATED APPLICATION

This application is a continuation-in-part patent application of co-pending U.S. application Ser. No. 16/281,505, filed Feb. 21, 2019 for a "TRANSPARENCY REPAIR SYSTEM" which is a completion application of U.S. Provisional Patent Application Ser. No. 62/633,837, filed Feb. 22, 2018, the disclosure of which is hereby incorporated by reference in its entirety.

BACKGROUND OF THE INVENTION

1. Field of the Invention

The present invention pertains to transparencies. More particularly, the present invention concerns aircraft and aerospace transparencies, such as, windows, canopies, lenses and other similar plastic products. Even more particularly, the present invention pertains to repair kits for repairing deep scratches and gouges occurring in such transparencies.

2. Prior Art

As is known to those skilled in the art to which the present invention pertains, coated transparencies are widely used in aerospace and aircraft windows, canopies, lenses and similar objects. These transparencies, which are usually fabricated from acrylics, coated polycarbonate and thermoset plastics, are subject to damage due to scratching, gouging, clings and other damaging occurrences during flight as well as maintenance.

Therefore, the art, in seeking to alleviate this problem, has taught the application of clear protective coatings such as clear polyurethanes and the like to effectuate, not only protection against UV degradation, but to prevent and minimize such damaging effects.

Ordinarily, light scuffs and scratches can be polished out of coated transparencies using any one of commercially available polishes. However, such polishes, which are usually available as either an aqueous or viscous liquid, normally, contain a small amount of abrasive material such as alumina or cerium oxide. These abrasive materials smooth out the transparency surface. However, where the damage is too deep, standard polishing cannot replenish the transparency surface. Thus, it is to be appreciated that there exists a need for a repair medium which can replenish the transparency surface when such overly damaging events occur.

SUMMARY OF THE INVENTION

The present invention, as is more fully described hereinafter, provides a composition as well as method for repairing deep scratches, gouges, etc. and which is particularly useful for aircraft and aerospace transparency repair.

Generally, the present invention comprises, in a first aspect, a polishable two-part, solvent-free composition for repairing the transparencies and, in its second aspect, a method for deploying the two-part composition or system to repair both uncoated and coated transparencies, and which incorporates an optical grid into the repair system electromagnetic shielding.

For a more complete understanding of the present invention reference is made to the following detailed description and accompany examples.

DESCRIPTION OF THE INVENTION

As noted above, the present invention, provides a composition as well as a method for repairing deep scratches, gouges, etc. and which is particularly useful for aircraft and aerospace transparency repair.

Generally, the present invention comprises, in a first aspect, a polishable two-part, solvent-free, composition for repairing transparencies and, in a second aspect, a method for deploying the two-part composition or system to repair both uncoated and coated aircraft and aerospace transparencies and other plastic transparencies.

With more particularity, the present two-part polishable system comprises: a solvent-free resin component which, when cured, yields a thermoset polyurethane.

The first part of the system is a resinous material or resin component (Part A). The resin component includes: (a) a hydroxy-terminated polyol, (b) a light stabilizer which, provides weatherability, and (c) a catalyst.

The Part A hydroxy-terminated polyol, as used herein, the polymeric polyol may be either a polyether or polyester polyol having at least two primary hydroxy groups, as well as mixtures thereof.

Preferably, the polyol comprises a polyester polyol, alone, or in admixture with the chain extender or other polyester and/or polyether polyols.

Most preferably, the polyol is an aliphatic polyester primary hydroxy terminated triol.

In practicing the present invention, a particularly preferred polyester triol is that sold commercially under the name CAPA 3091 which is identified as a polyester triol polyol terminated by primary hydroxyl groups. This polyol has a molecular weight of 900 and a typical hydroxyl value of 183 mg KAH/g. It is identified as a colorless liquid which can be processed under ambient conditions.

As noted above, the triol may be in admixture with a dihydric or higher hydroxy-terminated aliphatic polyester polyol or other primary hydroxy terminated polyester polyol such as a dihydroxy polyester polyol, a trihydroxy polyester polyol and the like. These latter polyols are well-known and commercially available such as those sold under the name CAPA 2054 and CAPA 3031, respectively.

Where an admixture of the triol and other polyol is used, the respective amounts of each will be determined by the respective molecular weights thereof. However, the triol remains the predominant polyol with minor amounts of the other polyol.

A light stabilizer is utilized to minimize UV degradation of the coating. Representative stabilizers include, for example, UV absorbers and hindered amine light stabilizers. The light stabilizer is preferably a liquid hindered amine light stabilizer, which also improves weatherability.

Useful hindered amine light stabilizers are those sold by BASF under the marks Tinuvin 123, and Tinuvin 765.

It should be noted that by using the hydroxy-terminated triol the cured composition hereof is a thermoset polyurethane.

The third component of the first part of the two-part system is the catalyst, including, any one of the well-known tin or zinc-based catalysts or other metal-based catalysts.

Other useful metallic catalysts include aluminum, bismuth and zirconium.

Representative of such tin catalysts are, for example, dibuyltin dilaurate and stannous octoate.

Other useful tin-based catalysts include, for example, dioctyltin dineodecanoate, dimethyltin dilaurate, tin thioglycolate and the like as well as mixtures thereof. Where used, the preferred tin catalyst is either dibutyltin dilaurate or stannous octoate.

As noted, it is possible to use a zinc or other non-tin catalyst. A particularly preferred class of non-tin catalysts, and which are particularly adapted for the acceleration of the reaction between a polyol and an isocyanate are those sold by King Industries under the mark K-Kat.

Where used, the non-tin catalyst is preferably a zinc catalyst.

The first part of the system may, also, include a chain extender such as a short chain diol, which may be the same or a different polyol from that used to define the hydroxy-terminated polyol resin material.

The diol may also be used in admixture with a different Part A hydroxyl-terminated polyol.

Among the useful chain extender diols are, for example, 1,4-butane diol, 1,3-propane diol and the like as well as mixtures thereof.

Where the triol is used in admixture with a chain extender, the triol will be present in a respective weight ratio of about 10 parts of triol to about 1 part of chain extender and, preferably, of from about 8 parts of triol to about 1 part of chain extender. The chain extender is present in an amount ranging from about 7 to about 13 parts, by weight, based upon the entire weight of the first component or Part A and is, preferably, present in an amount reaching from about 8 to about 12 parts, by weight, based upon the entire weight of the Part A component.

In formulating the first part of the composition the polyol or polyol mixture, with or without the chain extender, is present in an amount ranging from about 75 to about 95 parts, by weight, based upon the entire weight of the first component and, preferably, is present in an amount ranging from about 85 to about 95 parts, by weight, of the first component.

A minimal amount of the light stabilizer is required to impart the requisite stability and weatherability desired in the composition as used. The stabilizer is present in an amount ranging from about 0.5 parts to about 1.5 parts, by weight, based upon one hundred parts, by weight, of the first component.

The catalyst is utilized in an amount ranging from about 0.4 to about 0.8 parts, by weight, based upon on one hundred parts, by weight, of the first component.

It should be noted that the resin portion of the two-part composition is a homogeneous solution which is storage stable for about one year.

The second part of the two-part system is an isocyanate (Part B). The selected isocyanate is preferably an aliphatic polyisocyanate and, in particular, an aliphatic diisocyanate. A particularly preferred diisocyanate is that sold by Covestro under the name Desmodur N-3300. This product is identified as an HDI trimer which is used as a hardener for polyurethane coating systems.

In preparing the repair kit, per se, the first part and the second part are used in a respective weight ratio of about 1:1 to about 1:3 and, preferably, from 1:1.5 to about 1:2.

In preparing the product the two parts are blended together at ambient conditions, with stirring, for a period of time ranging from about 20 seconds to about 30 seconds. Initial mixing of the two components gives a cloudy solution. Once the mixture becomes clear, it is ready for application.

In deploying the present two-part mixture, after the composition becomes clear, it is brushed into the transparency gouge or scratch and then, before being cured is covered with a release film and smoothed out with a squeegee or other similar utensil. Enough resin is employed to fill the gouge or scratch and is bridged or blended onto the surrounding undamaged area.

The release film is, preferably, a fluorinated ethylene-propylene film, known as an FEP release film. The deployment of the FEP film enables the polyurethane to fill the scratch or gouge and provide a smooth exterior surface. This film is transparent, smooth, non-stick and is able to cling to the coating during cure. Also, it is easily removed after cure.

The film, itself, is smoothed out with a squeegee to remove any bubbles, etc. on the repair area and to provide a smooth exterior surface on the repair. After a limited amount of time of about 2 hours, the film is removed to reveal the repaired area.

The resulting repair is solvent-free; cures at room temperature; is rain erosion resistant and is stabilized against UV degradation.

It has now been found that it is possible to incorporate an optical grid into the repair system to increase the efficacy thereof, by providing a means for electromagnetic shielding.

In deploying the optical grid, it is emplaced on the transparency to be repaired after any peelings are removed. The grid, which is preferably an optical mesh of the type which are well known and commercially available, is emplaced onto the transparency prior to the coating being applied thereto.

When utilized, the mesh is initially held in place either by gravity or by hand holding until the repair resin is applied thereover.

As described above, thereafter, the composition is brushed onto the transparency gouge or scratch after it becomes clear and before it is cured. The release film is applied thereover, smoothed out with a squeegee or other similar utensil.

Again, and as described above, the film is subsequently removed to reveal the repaired area.

The incorporation of the optical grid or mesh is optimal when used in conjunction with a transparency that has a gold, ITO or combination thereof coating applied thereto with a urethane coating thereatop.

The present invention with the optical grid is particularly useful with the well-known polycarbonate or acrylic transparencies.

For a more complete understanding of the present invention the following is a nonlimiting example. In the example, all parts are by weight, absent indications to the contrary.

EXAMPLE

An initial master batch of the Part A component is made by adding together at ambient conditions the resins of Part A in a polyethylene bottle. The bottle is roll mixed for a minimum of two hours to obtain Master Batch A.

A repair kit is prepared by charging 2.5 parts of Master Batch A into a syringe (Part A syringe). Next, 4.5 parts of a diisocyanate is charged into another syringe (Part B). The two syringes are, then, charged into a suitable reaction vessel such as a mixing dish at room temperature and pressure and mixed for about 20 seconds until the resin is clear.

Thereafter, the coating is brushed into a damaged area using a painter's brush, as an applicator. An FEP film is, then, placed over the repair area.

Pressure is thereafter applied with a squeegee to smooth out the repaired area. After about two hours, the film is removed thereby revealing the repaired area.

Table I below sets forth the ingredients and amounts thereof used to prepare the repair resin system.

|  | AMOUNT, pbw |
|---|---|
| Batch A | |
| Polyester polyol*(1) | 88.0 |
| 1,4 butanediol | 10.5 |
| Tinuvin | 1.0 |
| Dibutyltin Dilaurate | 0.5 |
| PART B | |
| Polyisocyanate*(2) | 100 |

(1)CAPA 3091
(2)DESMODUR N-3300

When applied to a deeply scratched transparency in the above-described manner a repaired transparency is obtained.

It should be noted that while the present invention has been described with reference to aircraft and aerospace transparencies it is equally applicable to other plastic transparencies.

Having thus described the invention, what is claimed is:

1. A method for repairing an aerospace or aircraft transparency that comprises an electromagnetic shielding coating, the method comprising:
    a) removing any coating surrounding a scratched or gouged transparency area of the aerospace or aircraft transparency to be repaired;
    b) emplacing an electromagnetic shielding optical grid atop the scratched or gouged transparency area of the aerospace or aircraft transparency;
    c) applying to the scratched or gouged transparency area of the aerospace or aircraft transparency atop the electromagnetic shielding optical grid, a two-part component system which comprises a blend of:
        (1) a hydroxy-terminated polyol, a light stabilizer and a catalyst defining Part A;
        (2) an aliphatic polyisocyanate defining Part B; and
    d) placing a fluorinated ethylene propylene (FEP) release film thereover and smoothing the FEP release film, and, thereafter, curing the blend which when cured, provides a thermoset polyurethane.

2. The method of claim 1, wherein Part A further includes a chain extender consisting essentially of a short chain diol.

3. The method of claim 1, wherein the hydroxy-terminated polyol is either a polyether or polyester polyol having at least two primary hydroxy groups and mixtures thereof.

4. The method of claim 3, wherein the hydroxy-terminated polyol is a polyester triol terminated by primary hydroxyl groups.

5. The method of claim 4, wherein the hydroxy-terminated polyol is an aliphatic polyester primary hydroxy-terminated triol.

6. The method of claim 1, wherein the light stabilizer is a liquid hindered amine light stabilizer.

7. The method of claim 1, wherein the catalyst is either a zinc-based or a tin-based catalyst.

8. The method of claim 1, wherein the aliphatic polyisocyanate is an aliphatic diisocyanate.

9. The method of claim 1, wherein Part A and Part B are present in a weight ratio of from about 1:1 to about 1:3.

10. The method of claim 1, wherein the electromagnetic shielding coating comprises a gold, indium tin oxide, or combination thereof coating.

11. A method for preparing an aerospace or aircraft transparency repair kit comprising: placing an electromagnetic shielding optical grid atop a transparency that comprises an electromagnetic shielding coating to be repaired, blending together at ambient conditions with stirring for a period of time ranging about twenty seconds to about thirty seconds to form a repair blend, a two-part repair kit comprising the two-part component system of claim 1 and, thereafter, applying the repair blend over the electromagnetic shielding optical grid.

12. A repair system, comprising:
    an electromagnetic shielding optical grid for restoring the electromagnetic shielding properties of an electromagnetic shielding coating of an aerospace or aircraft transparency;
    a two-part component system applied over the electromagnetic shielding optical grid which two-part component system comprises a blend of:
        (1) a hydroxy-terminated polyol, a light stabilizer and a catalyst defining Part A; and
        (2) an aliphatic polyisocyanate defining Part B; and
    a fluorinated ethylene propylene (FEP) release film applied over the two-part component system.

* * * * *